US006481669B1

(12) United States Patent
Griffin

(10) Patent No.: US 6,481,669 B1
(45) Date of Patent: Nov. 19, 2002

(54) PNEUMATIC ACTUATOR FOR A STORES CARRIAGE AND EJECTION SYSTEM

(75) Inventor: Dennis Griffin, Shalford (GB)

(73) Assignee: Flight Refuelling Limited, Dorset (GB)

( * ) Notice: Subject to any disclaimer, the term of this patent is extended or adjusted under 35 U.S.C. 154(b) by 0 days.

(21) Appl. No.: 09/576,254

(22) Filed: May 24, 2000

(30) Foreign Application Priority Data

May 24, 1999 (GB) .............................................. 9912075
Mar. 10, 2000 (GB) .............................................. 0005858

(51) Int. Cl.⁷ .................................................. B64D 1/08
(52) U.S. Cl. ...................................... 244/137.4; 89/1.54
(58) Field of Search ........................ 244/137.4, 104 FP; 267/64.11; 89/1.54, 1.59; 91/168

(56) References Cited

U.S. PATENT DOCUMENTS

| 2,869,523 A | * | 1/1959 | Murphy |
| 2,979,938 A | | 4/1961 | Ottestad ........................ 73/12 |
| 4,064,977 A | * | 12/1977 | Taylor |
| 4,204,456 A | | 5/1980 | Ward ............................. 89/1.5 |
| 4,850,553 A | | 7/1989 | Takata et al. ............ 244/137.4 |
| 4,896,587 A | * | 1/1990 | Mintgen |
| 4,964,595 A | * | 10/1990 | Mordhaus |
| 5,052,639 A | * | 10/1991 | Lemacon |
| 5,857,647 A | | 1/1999 | Jakubowski, Jr. ........ 244/137.4 |
| 5,904,323 A | | 5/1999 | Jakubowski, Jr. ........ 244/137.4 |
| 6,119,982 A | * | 9/2000 | Jakubowski et al. |

FOREIGN PATENT DOCUMENTS

| EP | 0 180 519 | 5/1986 |
| FR | 2343649 | 10/1977 |
| GB | 860090 | 2/1961 |
| GB | 1163312 | 9/1969 |
| GB | 1401126 | 7/1972 |
| GB | 1541975 | 3/1979 |
| GB | 1594268 | 7/1981 |
| GB | 2 129 495 | 5/1984 |
| GB | 2 335 905 | 10/1999 |
| WO | 99/21760 | 5/1999 |

* cited by examiner

Primary Examiner—Charles T. Jordan
Assistant Examiner—T. Dinh
(74) Attorney, Agent, or Firm—Finnegan, Henderson, Farabow, Garrett & Dunner, L.L.P.

(57) ABSTRACT

A pneumatic actuator operable to carry a missile on an aircraft and to eject the missile from the aircraft in flight on demand, includes a differential area piston which is slidable in a closed chamber which is filed with air under pressure. The smaller diameter portion of the piston is slidably engaged in a cavity which is formed in an end wall of the closed chamber. An actuating rod extends co-axially from the smaller diameter piston portion out of the closed chamber. Initial movement of the piston to actuate ejection of the missile is effected under low force by the application of pressure to the end of the smaller diameter piston portion remote from the larger diameter piston portion until the smaller diameter portion is displaced from the cavity into the closed chamber which allows the largest possible force to be exerted on the piston by the action of the compressed air on the larger diameter piston portion. Releasable hold back means operable to hold the piston with the smaller diameter piston portion slidably engaged in the cavity are provided in one embodiment. In another embodiment, the interior of the closed chamber serves as the compressed air storage reservoir. In a further embodiment, the compressed air storage means includes an air pressure intensification system.

10 Claims, 9 Drawing Sheets

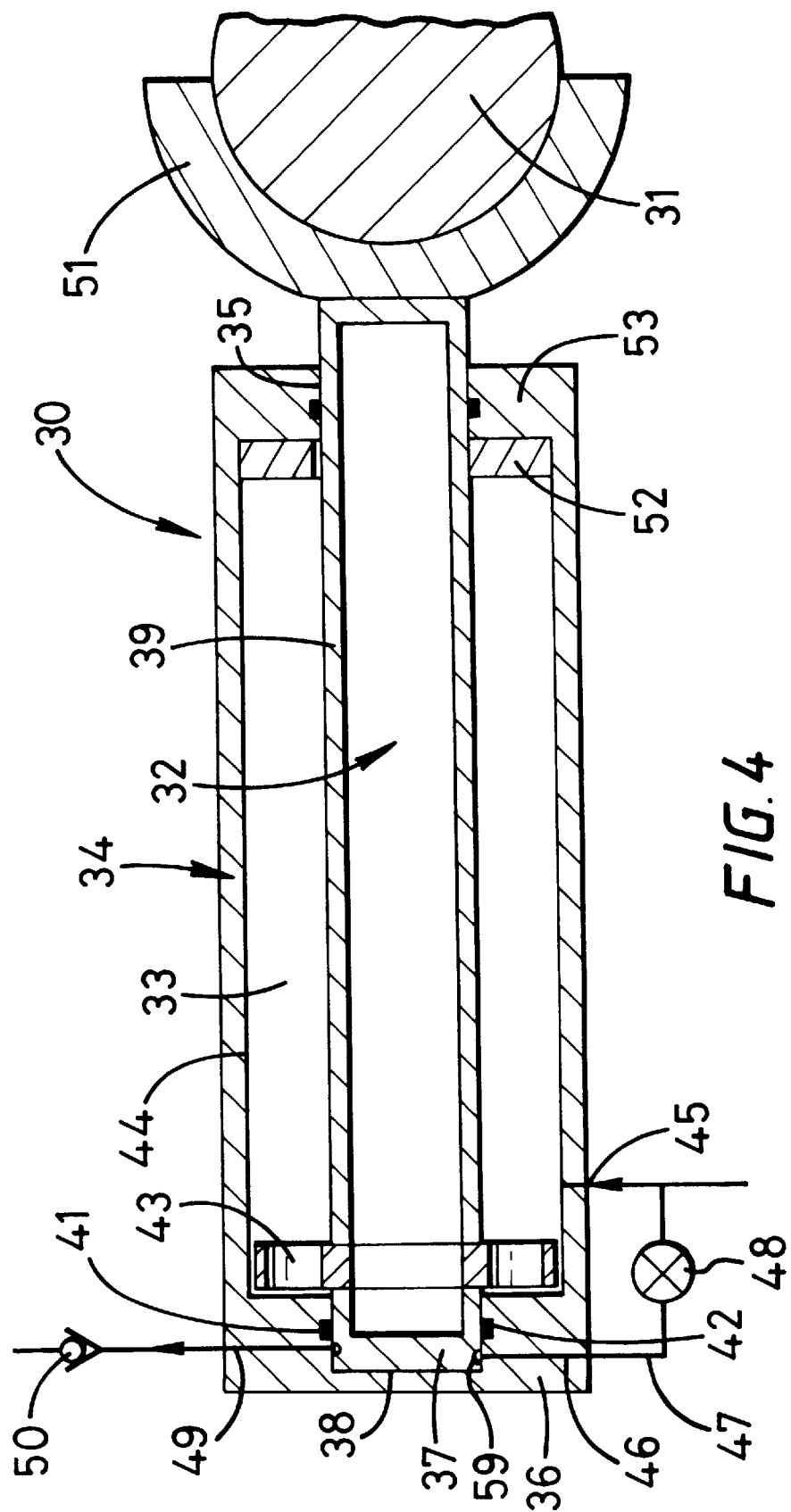

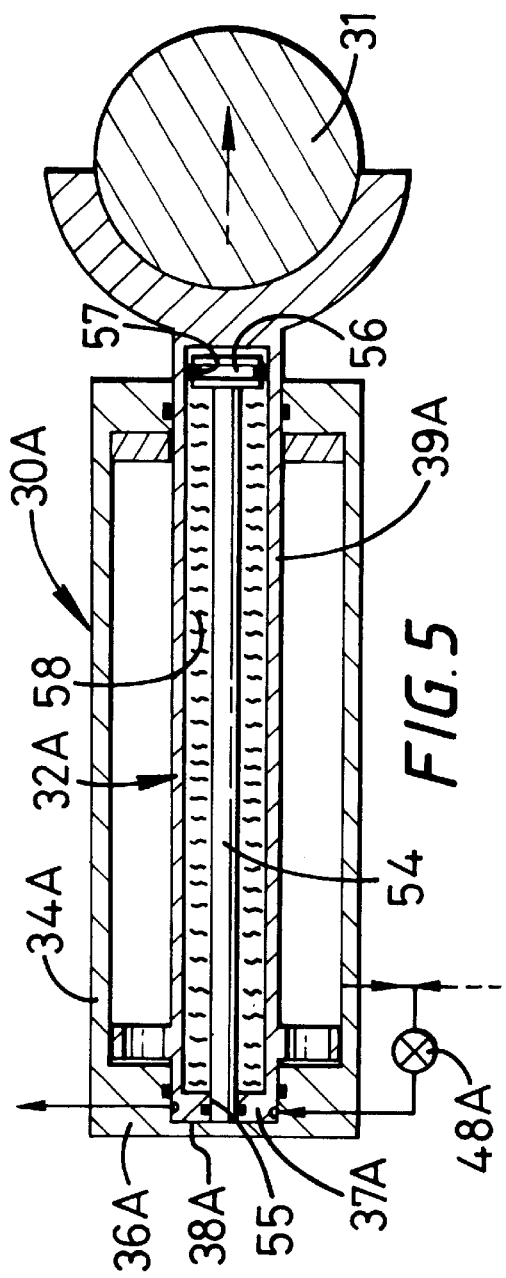
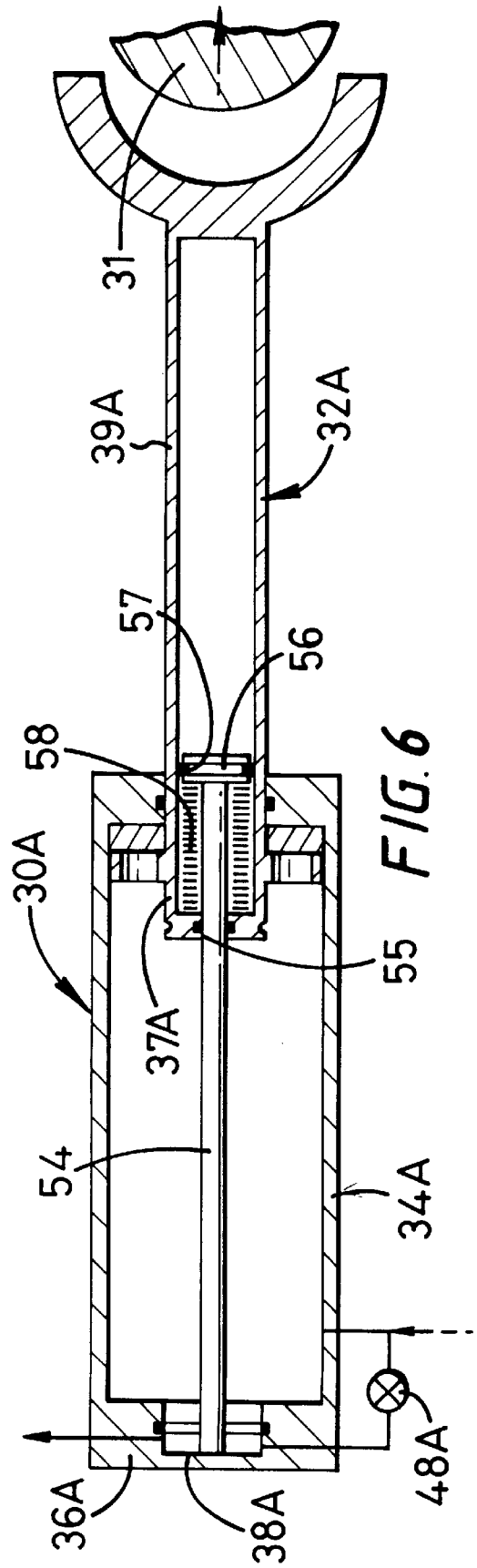

PNEUMATIC ACTUATOR FOR A STORES CARRIAGE AND EJECTION SYSTEM

This invention relates to a pneumatic actuator which is suitable for any high speed and/or high force applications and more particularly although not exclusively, to a pneumatic actuator for a stores carriage and ejection system which is operable to carry stores such as an airborne weapon or missile, on an aircraft in flight and to eject those stores from the aircraft on demand.

U.S. Pat. No. 5,932,829 discloses a missile storage and ejector rack assembly which is to be used with a pneumatic release and ejection system of the type described in the U.S. Pat. Nos. 5,583,312 and 5,857,647. U.S. Pat. No. 5,904,323 discloses a missile store release system which can be used with any suitable pneumatic, hydraulic or pyrotechnic ejection mechanism. GB-A-2,078,912 discloses a missile launcher having fore and aft ejection rams and pyrotechnic ejection cartridges which are fired simultaneously to generate hot gas which is fed to the rams to extend them on ejection of the missile. Use of pneumatics results in a better facility for controlling the pressure that acts to extend the ejector rams than is the case with pyrotechnic cartridges. This leads to an ability to charge different rams of a multi-ram ejector system to different pressures which is advantageous.

An object of this invention is to provide a pneumatic actuator which is simple, compact and efficient and which when used in an airborne weapon carriage and ejection system has a performance which compares more favourably with pyrotechnic systems than do conventional pneumatic systems.

According to one aspect of this invention there is provided a pneumatic actuator for a stores carriage and ejection system which is operable to carry the stores on an aircraft in flight and to eject those stores from the aircraft on demand, the actuator having an actuating member which includes an actuating rod portion which extends from a differential area piston having two piston portions, the cross-sectional areas of which are different, the differential area piston being slidable in a closed chamber which is filled with gas under pressure when the actuator is operated and from which the actuating rod portion projects, one of the piston portions being slidably engageable in a cavity which is formed in an end wall of the closed chamber and which has a cross-section similar to that of said one piston portion, there being means operable when said one piston portion is engaged in said cavity to apply gas under pressure to a surface of said one piston portion which is formed at an end thereof remote from the other piston portion whereby to apply an actuating thrust to the actuating member and to displace said piston portion from the cavity so that the greater cross-sectional area of the differential area piston is subjected to the gas under pressure within the closed chamber.

In a preferred embodiment releasable hold back means operable to hold the piston in the location that is furthest from the location of the piston at which the volume within the chamber is at its maximum are provided.

Hence initial movement of the piston (once the piston has been released when any releasable retaining means or said releasable hold back means are provided) will be effected under a low force until said one piston portion has been urged out of said cavity, such displacement of the piston allowing the largest possible force to be exerted on the piston by the action of compressed gas and the transfer of the greater possible portion of the expansion energy of compressed gas in the chamber to any load connected to the piston.

In a preferred embodiment the chamber is a cylinder which is closed at one end and is separated by a wall from another chamber which is charged with compressed gas in use of the actuator, the wall forms an aperture which serves as said cavity, the two piston portions form a stepped piston, and the actuating rod portion is a piston rod, the stepped piston being mounted at one end of the piston rod by the one of the two piston portions that has the smaller cross-sectional area, wherein the piston rod extends through the aperture and the other chamber and has a cross-sectional area which is smaller than that of the aperture which is sized to slidably receive said one piston portion of the stepped piston, the releasable hold back means being operable to hold the piston adjacent to the wall with said one piston portion received in the aperture.

Preferably the dimensions of the piston rod and the aperture allow substantially unrestricted gas flow between the other chamber and the cylinder when said one portion of the piston is displaced from the aperture towards the closed end of the cylinder. Valve means may be provided which are operable to place both sides of the piston in communication one with the other for a return stroke of the piston when the piston has been driven to the closed end of the cylinder by the action of compressed gas in the other chamber. The valve means may comprise a bi-stable shuttle valve which is switched from one of its states to the other by arrival of the piston at either end of the cylinder.

The releasable hold back means conveniently include an external latch. The latch may include a pivoted arm having an arcuate end portion which functions in the manner of a zero lift cam, the arm being adapted to be positioned so that the end portion abuts an abutment carried by a member which is coupled to the piston whereby to hold the piston in said location, the piston being released by displacement of the arm so that the end portion is moved to one side of the abutment, whereby the abutment is free for movement with the piston. Means operable to displace the arm may be provided, those means together with the arm being dynamically balanced. The external latch may include a collapsible pair of under-centre strut links which are coupled with the piston, which are held by the latch in stable equilibrium against the action of compressed gas on the piston and which are arranged to collapse and allow movement of the piston when the latch is released.

According to another aspect of this invention, there is provided a stores carriage and ejection system which is operable to carry stores on an aircraft in flight and to eject those stores from the aircraft in flight on demand, said system including at least one fluid pressure operable ejection ram which includes a piston which is slidably mounted in a cylinder, and compressed gas storage means adapted to supply compressed gas as the working fluid for operating said at least one ejection ram to eject the stores from the aircraft, wherein the interior of the cylinder of the or each said at least one ejection ram serves as said compressed gas storage means.

In such a stores carriage and ejection system which includes at least two fluid pressure operable ejection rams, the cylinders of the ejection rams may be charged to different pressures for ejecting the stores as may be required when the center of gravity of the stores is not equally spaced from each ram piston.

Preferably the piston of said at least one ejection ram is a differential area piston having two piston portions, the cross-sectional areas of which are different, and an actuating rod portion which projects substantially co-axially with the two piston portions out of the cylinder which is a closed chamber which is filled with gas under pressure when the ejection ram is operated, the one of the piston portions that has the larger cross-sectional area being slidably engagable in a cavity which is formed in an end wall of the closed chamber and which has a cross-section similar to that of said one piston portion so that the piston is urged towards said end wall by the gas pressure loading thereon when said one piston portion is engaged in said cavity and said closed chamber is filled with gas under pressure, said end wall being remote from a location in the closed chamber from which the actuating rod portion projects out of the closed chamber, there being means operable to apply gas under pressure to a surface of said one piston portion when said one piston portion is engaged in said cavity, said surface being formed at an end of said one piston portion which is remote from the other piston portion whereby to apply an actuating thrust to the actuating rod portion and to displace said one piston portion from the cavity so that the greater cross-sectional area of the differential area piston is subjected to the gas under pressure within the closed chamber.

Throttling means may be provided to restrict flow of gas under pressure that is applied to said surface of said one piston portion. Additionally or alternatively said surface of said one piston portion may be formed with a recess into which the flow of gas under pressure that is applied to said surface is introduced. Furthermore, the end of said one piston portion that forms said surface may be tapered.

The piston may be provided with a perforated flange on said other piston portion, the flange being perforated so as to allow free flow of gas therethrough and being adapted to locate the piston within the closed chamber as the ejection ram is operated to eject the stores. Cushioning means may be provided for cushioning arrest of the piston at the end of its stroke to extend the ejection ram. The piston may be retracted manually from the end of its stroke to re-engage said one piston portion in said cavity after extension of the ejection ram. Alternatively resilient means may be provided to effect automatic retraction of the piston. Conveniently the piston is tubular and said cushioning means and/or said resilient means may comprise a plunger which is fixed with respect to the cylinder and which is slidably engaged within the interior of the hollow piston, there being resilient means which may be a spring arrangement or compressed gas which act between the plunger and the piston to urge the piston to said end wall.

According to a further aspect of this invention there is provided a stores carriage and ejection system which is operable to carry stores in an aircraft in flight and to eject those stores from the aircraft in flight on demand, said system including at least one fluid pressure operable ejection ram which includes a piston which is slidably mounted in a cylinder, and compressed gas storage means adapted to supply compressed gas as the working fluid for operating said at least one ejection ram to eject stores from the aircraft, wherein said compressed gas storage means includes a gas pressure intensification system which is operable to intensify the pressure of gas supplied to operate said at least one fluid pressure operable ejection ram.

Preferably said stores carriage and ejection means includes pneumatically operable latch means which are provided for retaining stores which are to be carried for ejection and which are actuated to release those stores for ejection, said gas pressure intensification system also being operable to intensify the pressure of gas supplied to operate said latch means.

Conveniently said gas pressure intensification system includes a gas pressure intensifier having an inlet for receiving compressed gas stored in said compressed gas storage means and an outlet for connection to the or each fluid pressure operable device of the stores carriage and ejection system, and a valve which is operable to close said outlet and thereby to retain gas within the gas pressure intensifier until a certain rapid pressure rise is detected whereupon it opens fully to allow the intensified gas pressure to be applied to the or each fluid pressure operable device.

The gas pressure intensifier may comprise a stepped piston slidable in a closed stepped cylindrical chamber, the stepped piston being hollow and having two ends, the larger diameter end being open and the smaller diameter end being closed, the stepped piston dividing the interior of the stepped cylinder into an annular space which is formed around the smaller diameter portion of the stepped piston between the steps in the piston and the cylinder, an end space formed in the smaller diameter portion of the cylinder between the stepped piston and the closed end of the smaller diameter portion of the cylinder and a third space which comprises the interior of the stepped piston and the remainder of the larger diameter portion of the stepped cylinder between the stepped piston and the closed end of the larger diameter portion of the stepped cylinder, the inlet of the gas pressure intensifier communicating with the annular space and the outlet communicating with the end space, there being one way valves in the stepped portion of the stepped piston and in the closed end of the smaller diameter portion of the stepped piston, said one-way valves allowing flow from the annular space to the third space when a certain pressure has been built up in the annular space and allowing flow from the third space to the end space when another certain pressure has been built up in the third space.

The valve that closes the outlet of the gas pressure intensifier conveniently comprises a differential area piston valve having an obturating portion at a smaller diameter end of the piston valve and a larger diameter piston portion which slides in a bore in a housing of the valve, and a passage of flow restricted dimensions which places the outlet of the gas pressure intensifier in restricted communication with a space within the housing which is bounded by the larger diameter piston portion, there being a coil spring urging the piston valve to seat the obturating member to close the outlet and a plenum chamber with an outlet formed between the larger diameter piston portion and the obturating member, the outlet of the gas pressure intensifier being in communication with the outlet of the plenum chamber when the piston valve is unseated.

Several pneumatic actuators and a gas pressure intensifying system for use in an airborne weapon carriage and ejection system, which embody this invention and two alternative forms of releasable hold-back mechanisms for use with one of those actuators will be described now by way of example with reference to the accompanying drawings of which:

FIG. 4 is a schematic cross-sectional view of another pneumatic actuator carrying a missile;

FIG. 5 is a view similar to FIG. 4 of a modified form of the actuator shown in FIG. 4, but drawn to a smaller scale;

FIG. 6 is a view similar to FIG. 5 showing the actuator of FIG. 5 extended to eject the missile;

Figure 1:
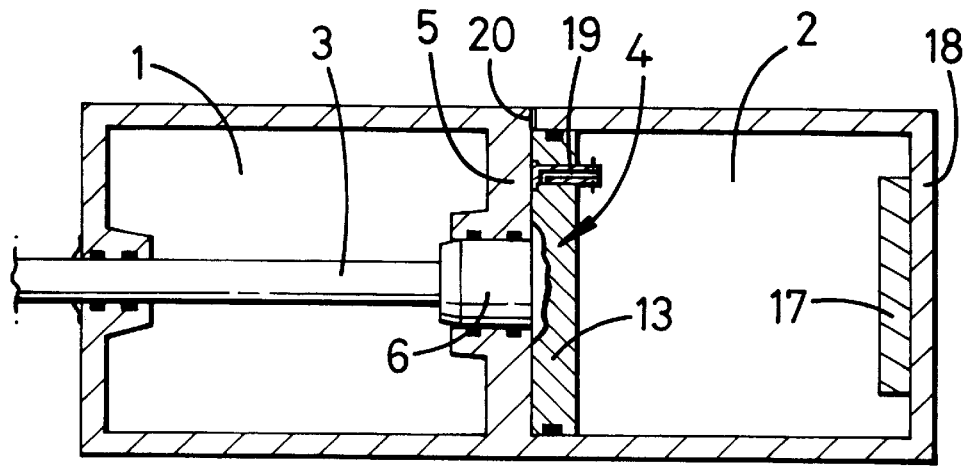
FIG. 1 is a schematic cross-sectional view of one of the pneumatic actuators

FIG. 1 shows a pneumatic actuator having a chamber 1 in combination with one pneumatic cylinder 2, the chamber 1 being for charging with compressed gas when the pneumatic actuator is prepared for use. The pneumatic actuator has an actuating member in the form of the piston rod 3 with a stepped piston 4 mounted on it at one end. The larger diameter portion 13 of the stepped piston 4 slides in the bore of the pneumatic cylinder 2 which is closed at its end 18 remote from the chamber 1. The pneumatic cylinder 2 is separated from the chamber 1 by an annular divider wall 5. The central aperture of the annular divider wall 5 is sized to slidably receive the smaller diameter portion 6 of the stepped piston 4. A pair of sealing rings are fitted into respective ones of a pair of annular grooves that are formed in the central aperture of the annular divider wall 5. The sealing rings cooperate with the smaller diameter piston portion 6 when the latter is received in the central aperture so as to seal against gas flow around the piston portion 6 from the chamber 1 to the cylinder 2. The cross-sectional area of the piston rod 3 is smaller than that of the smaller diameter portion 6 of the stepped piston 4. The piston rod 3 extends through the chamber 1, being a sliding fit within a central aperture formed in the other wall of the chamber 1 so that the rod 3 projects from the chamber 1 away from the pneumatic cylinder 2.

When the chamber 1 is charged with pressurized air or other gas and the actuating member is positioned as shown in FIG. 1 with the smaller diameter piston portion 6 received within the central aperture of the annular divider wall 5 and the larger diameter piston portion 13 in abutment with that divider wall 5, the net axial load on the actuating member will be determined by the gas pressure acting on the difference in areas between the cross-sectional area of the piston rod 3 and the cross-sectional area of the smaller diameter portion 6 of the stepped piston 4. This difference in areas is selected to limit the end load on the actuating member to acceptable proportions by a suitable choice of component diameters.

A buffer element 17, which may be a block of elastomeric material, is mounted on the end wall 18 to cushion impact of the piston 4 with the closed end wall 18 at that end of the stroke of the piston. A slidable shuttle valve 19 is fitted into the larger diameter portion 13 of the stepped-piston 4.

The shuttle valve 19 functions as a bi-stable shuttle valve which is switched from the state shown in FIG. 1 in which communication between the two sides of the larger diameter portion 13 of the stepped piston 4 is blocked by the valve 19, and the other state in which communication between both sides of the larger diameter portion 13 of the stepped piston 4 is provided by the valve 19. Switching of the bi-stable shuttle valve 19 from one of its states to the other is effected by arrival of the stepped piston at the respective end of its stroke in the cylinder 2. A restricted vent 20 which places the cylinder chamber between the annular divider wall 5 and the larger diameter portion 13 of the stepped piston 4 in communication with atmosphere, allows venting of the cylinder 2.

A releasable hold-back mechanism is provided to hold the piston 4 in the position shown in FIG. 1. The hold-back mechanism needs generally to be safe and stable when latched, but easily releasable when the actuator is required to contract.

Figure 2:
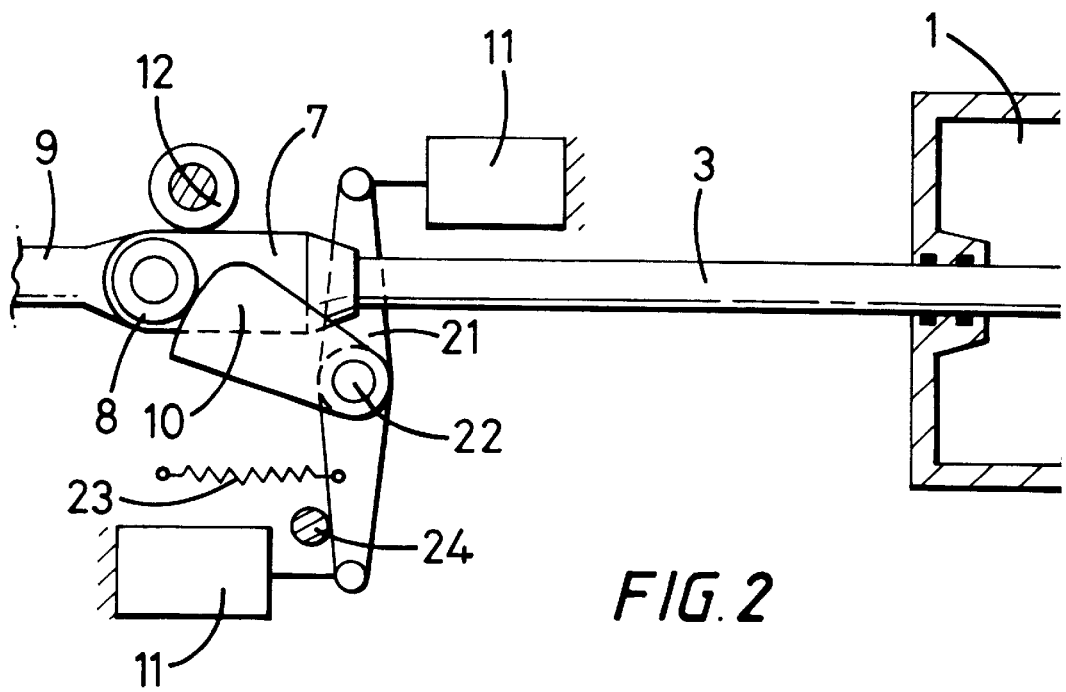
FIG. 2 is a schematic illustration of one form of releasable hold-back mechanism for the pneumatic actuator shown in FIG. 1.

FIG. 2 shows one possible form of releasable hold-back mechanism which is a latch which is outside the pneumatic actuator. A fork end 7 is provided at the end of the piston rod 3 outside the chamber 1. The fork end 7 carries a roller 8 and a connector 9 by which the actuating member is connected to the "load" which is to be accelerated by operation of the actuator.

A rotatable cam 10 comprises an arm having an arcuate end portion at one end and being mounted by its other end at the centre of a lever 21 from which it projects laterally. The lever 21 is pivotally mounted about its centre 22. The end of the arm has a profile formed as a radius centred about the pivot axis 22 of the lever 21 so that the arm functions as a zero lift cam 10. The lever 21 is held by a spring 23 against an abutment peg 24 so as to position the profiled end face of the cam 10 between the pivot mounting 22 of the lever 21 and the roller 8 and thereby to engage the latch. The reaction forces between the roller 8 and the cam 10 pass through their respective centres of rotation and therefore do not generate any opening movements so that the latch mechanism will remain in stable equilibrium until the cam 10 is forcibly rotated by an external influence.

A suitable external latch releasing influence may be provided by one or more solenoids, gas cylinders, or other low force actuators 11 which are coupled to either end of the lever 21 and are arranged so that their actuating forces extend along parallel paths. The latch will self-open once the cam 10 is rotated relative to the roller 8 in an anti-clockwise direction as seen in FIG. 2, beyond the extent of its radial profile, allowing the piston rod 3 to move in an unimpeded manner. In its locked position, the cam 10 is easily dynamically balanced with the lever 21 and the moveable portions of the releasing actuators 11. Lateral forces on the piston rod 3, arising from the direction of normal forces between the cam 10 and the roller 8, are resisted by contact between the fork end 7 and a second roller 12, or a bearing pad, attached to adjacent structure.

Figure 3:
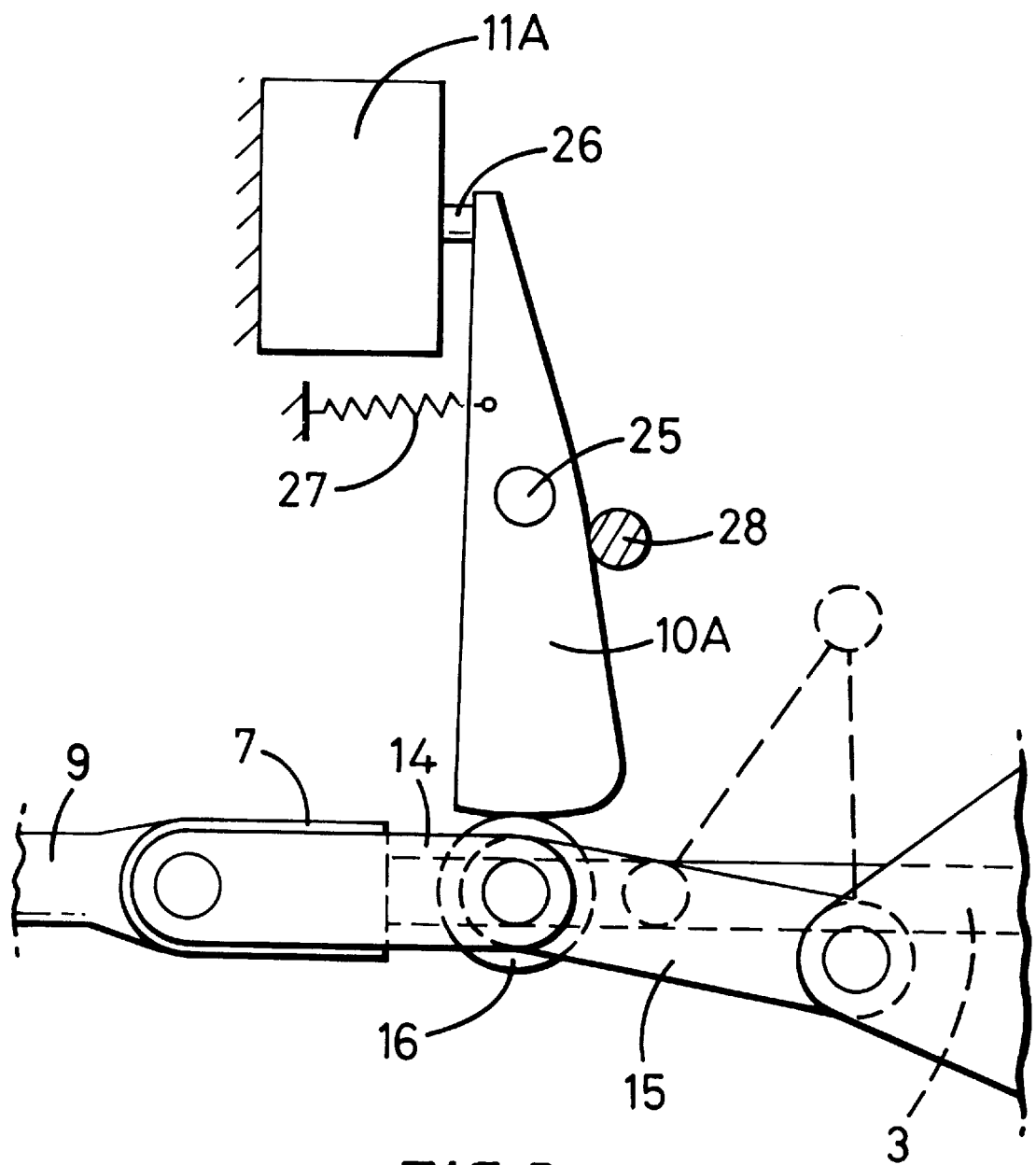
FIG. 3 is a schematic illustration of another form of releasable hold-back mechanism for the pneumatic actuator shown in FIG. 1.

FIG. 3 shows an alternative form of releasable hold-back mechanism in which the release actuator forces are further reduced as compared with the mechanism of FIG. 2, and no significant lateral forces on the piston rod 3 arise. FIG. 3 shows the piston rod 3 and its fork end 7 are restrained by a pair of under-centre links 14 and 15 and a roller 16 at the knee joint of those links 14 and 15, such that the links 14 and 15 act as a supporting strut which has a tendency to collapse by pivoting at the joints and thereby to allow disengagement of the latch. Such collapse of the supporting strut formed by the links 14 and 15 is prevented by contact between the roller 16 and a rotatable cam 10A which is a pivoted arm with a profiled end similar to the cam 10 described above with reference to and as shown in FIG. 2 but which is pivotally mounted on support structure about a pivot 25 intermediate its ends. The end of the cam 10A remote from the profiled end is hinged to the actuating rod 26 of a solenoid actuator 11A. A tension spring 27 holds the cam 10A against an abutment peg 28 when the cam 10A is in the position shown in FIG. 3 and the latch is engaged. The solenoid actuator 11A is arranged to pivot the cam 10A in a clockwise direction against the action of the spring 27, as seen in FIG. 3, so as to displace the profiled cam 10A to the left with respect to the roller 16 and allow collapse of the supporting strut to a condition which is indicated in dotted lines in FIG. 3. The disposition of the links 14 and 15 is such that no lateral component of compressive force is present at the fork end 7, so no lateral bearing pad or roller is necessary. A very low force actuator 11A will suffice to release the under-centre linkage, allowing it to collapse and thereby permit the main gas actuator shown in FIG. 1 to retract.

Once the releasable hold-back mechanism has been released, the first motion of the piston 4 will be effected under low force until the smaller diameter portion 6 of the stepped piston 4 has been urged out of the central aperture of the annular divider wall 5. Once the similar diameter portion 6 of the stepped piston 4 has been displaced from the central aperture of the annular divider wall 5, the gas reservoir 1 and cylinder 2 are pneumatically interconnected by the annulus that is formed between the piston rod 3 and the central aperture of the annular divider wall 5. This annulus will normally be adequately great in area to afford virtually unrestricted flow from the reservoir 1 into the cylinder 2, thereby allowing the largest possible force to be exerted by the piston 4 and transferring the greatest possible proportion of the expansion energy to the load connected to the piston rod 3 by the connector 9.

At the end of the stroke, the piston 4 impacts the buffer element 17 whereby impact damage between the piston 4 and the cylinder end wall 18 is prevented; As previously described, the slidable shuttle valve 19 is held in its closed state as shown in FIG. 1 as the piston moves from the annular divider wall 5 to the closed end wall 18, but at the end of that stroke, the shuttle valve 19 contacts the buffer 17 and thereby is pushed to its other state which allows gas pressure on both side of the larger diameter portion 13 of the stepped piston 4 to rapidly equalise. When the product of pressure and area on the side of the piston 4 nearer to the buffer 17 exceeds the product of pressure and area on the other side of the piston 4, there will be a nett retract force which will approximate to the product of the cross-sectional area of the piston rod 3 and the equalised gas pressure. The piston 4 will then be returned towards the annular divider wall 5 whereupon the cylinder 2 between the piston 4 and the end wall 18 will be vented through the shuttle valve 19 and thence to atmosphere by the restricted vent 20. These gas leaks will be insufficient to materially affect high speed performance of the actuator as they will have little time, for example less than 0.1 second, to cause any significant gas loss.

Figure 4A:
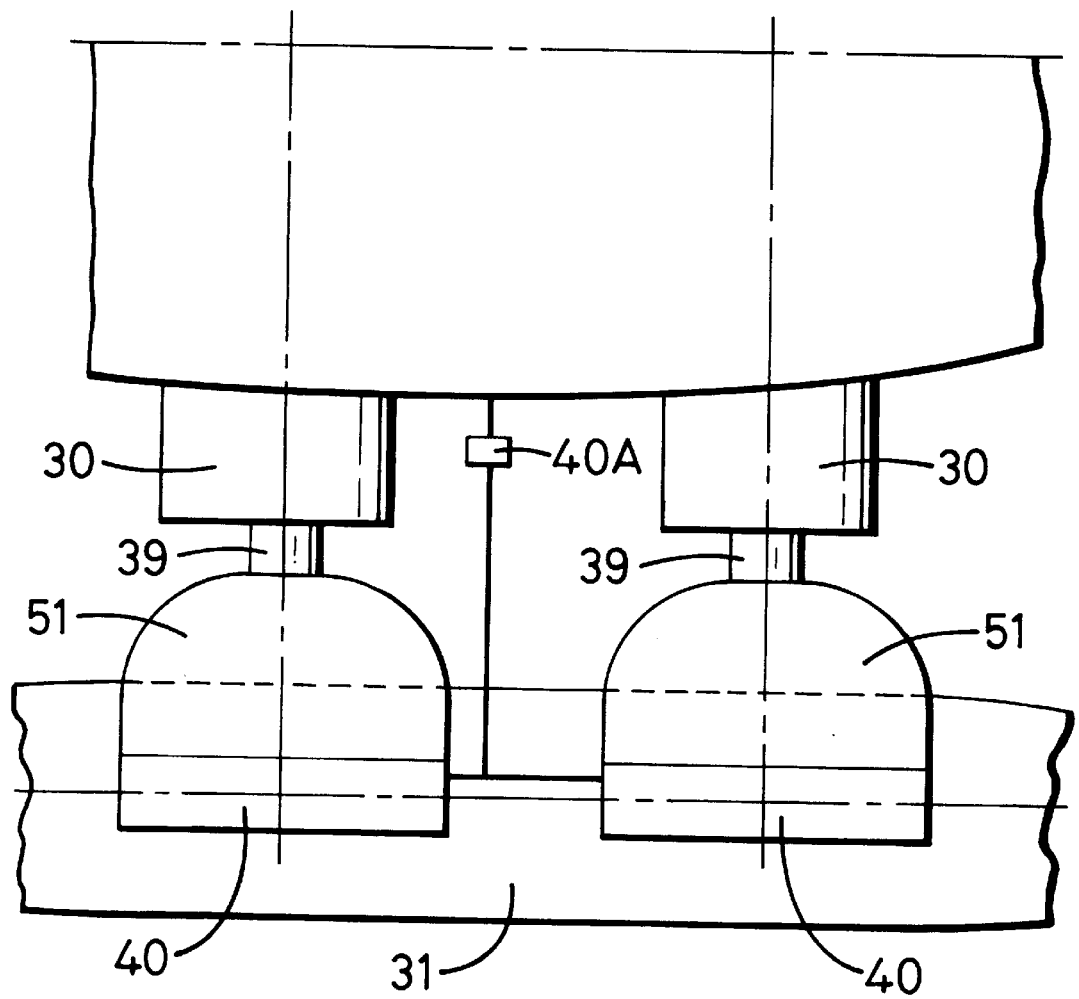
FIG. 4A is a diagrammatic illustration of a missile storage and ejection system which includes a pair of the actuators shown in FIG. 4.

FIG. 4 shows one ejector ram 30 of a missile storage and ejection system which includes two such ejector rams 30 which are similar to one another. The missile storage and ejection system was originally designed to be operated by firing pyrotechnic ejection cartridges which were to be fired to generate hot gas which was to be fed to the rams 30 to extend them. A feature of the missile storage and ejection system including the ejector ram 30 shown in FIG. 4 is that it is converted from pyrotechnic operation to the use of compressed cold gas as the energy source for effecting extension of the rams 30 to eject the stored missile 31. By the aspect of this invention that is embodied in the system that includes the ram 30 illustrated in FIG. 4, the cylinders of the rams 30 of the system are used to store the compressed cold gas required for ejection. This is an efficacious use of the existing volume therein, and enables a separate reservoir to be dispensed with, thereby economising on the system mass, cost and volume.

The ejector ram 30 shown in FIG. 4 includes a single stage ram piston 32 in a cylinder chamber 33 which is formed in a housing 34. The ram piston 32 extends through an aperture 35 formed by the housing 34 at one end of the cylinder chamber 33. The other end 36 of the cylinder chamber 33 is closed. The piston 32 has an enlarged head 37 which is a sliding fit in a closed ended cylindrical recess 38 which is formed in the closed end 36 of the cylinder chamber 33. The diameter of the enlarged head 37 is slightly larger than that of the piston shaft 39, that is the remainder of the ram piston 32. Hence the enlarged head 37 and the portion of the piston shaft 39 within the cylinder chamber 33 are two piston portions of a differential area piston.

An annular seal 41 is located in an annular groove 42 in the cylindrical wall of the recess 38. The seal 41 co-operates with the piston head 37 when the latter extends therethrough so as to seal against gas flow between the cylinder chamber 33 and the portion of the cylindrical recess 38 between the annular groove 42 and the closed end of the recess 38.

The piston shaft 39 carries a flange 43 near the enlarged head 37. The flange 43 locates within the cylindrical wall 44 of the cylinder chamber 33 and is generously perforated to allow free flow of gas through it.

The housing 34 has two ports 45 and 46 formed in it. The port 45 is in the cylindrical wall 44 near to the closed end 36. The port 45 communicates with the cylinder chamber 33 and is connected to a source of dry cold gas at a high pressure. The other port 46 is in the closed end wall 36 and communicates with the portion of the recess 38 between the annular groove 42 and the closed end of the recess 38. The port 46 is connected to the source of cold high pressure gas through a small pipe 47 and a servo valve 48. A bleed orifice 49 is formed in the closed end wall 36 to function as a restricted vent from the portion of the cylindrical recess 38 between the annular groove 42 and the closed end of the recess 38. A miniature check valve 50 is incorporated in the restricted vent formed by the bleed orifice 49.

The missile 31 is cradled in a piston yoke 51 which is fitted to the end of the piston shaft 39 that projects outside the housing 34 and that serves as an actuating rod portion.

An annular elastomeric buffer 52 is fitted to the annular end wall 53 of the cylinder chamber 33 that surrounds the aperture 35.

The missile storage and ejection system includes pneumatically operable latching means 40 operable to latch the missile 31 to the piston yoke 51 in which it is cradled. The system is provided with a servo system which is operable to actuate the servo valve 48 of each ejector ram 30 and subsequently to release the latching means.

The ejector rams 30 are mounted in the carrier aircraft with their ram pistons 32 substantially or near to the vertical and with their closed ends 36 uppermost. Each ram 30 would be contracted with its enlarged head 37 fitted into the cylindrical recess 38, before the cylinder 33 is charged with compressed gas.

In the event that a different level of force is required at each ram piston 32 of the system, which is not uncommon due to the proximity of the centre of gravity of the missile 31 to either piston 32, the two cylinders 33 will be precharged to different pressures, commensurate with the required centre of pressure applied to the missile 31. In particular, one ram housing 34, usually the aftermost of the ram housings 34, would be charged at full supply pressure which is limited by a pressure relief valve 40A whereas the other or forward ram housing 34 would be charged at a much reduced pressure, determined by a variable, ground settable pressure regulating valve which thereby provides the missile pitch control function.

The housings 34 of the ejector rams 30 of the missile storage and ejection system are designed to give the maximum practicable gas storage volume within the existing or specified space envelope constraints of the system installation within the aircraft. When each housing 34 is charged with dry high pressure gas, via the charging port 45, the respective piston 32 is urged towards the cylindrical recess 38 by the pressure of that gas on the small difference in areas between the enlarged head 37 and the piston shaft 39, the space within the cylindrical recess 38 between the enlarged head 37 and the closed end of the cylindrical recess 38 being vented to atmosphere via the bleed orifice 49.

When the missile 31 is to be ejected, the servo valves 48 are actuated simultaneously so that gas from the cylinder chamber 33 flows from the charging port 45 of each ram 30, through the respective servo valve 48 and the respective port 46 into the portion of the cylindrical recess 38 between the enlarged head 37 and the closed end of the cylindrical recess 38. Gas pressure thereby builds up in the cylindrical recess 38 and acts upon the enlarged head 37 thereby applying a nett axial force to the piston 32 and accelerating it with the missile 31 which is cradled in the piston yoke 51. After a short movement through about 15 mm, the enlarged head 37 of the piston 32 emerges from the cylindrical recess 38 which enables the gas pressure within the cylinder chamber 33 to act on the full cross-sectional area of the piston shaft 39, that condition continuing for the remainder of the full stroke of the piston 32 within the cylinder chamber 33. Hence the piston shaft 39 is urged out of the housing 34 so as to displace the missile 31 away from the aircraft structure to a location in which it is released by release of the latching means.

During the movement of the enlarged head 37 and the perforated flange 43 through the cylinder chamber 33, there is a small loss of gas through the bleed orifice 49 but the effect of that gas loss on the ejecting performance of the ram 30 is trivial because of the minor leakage area of the bleed orifice 49 and the short time period involved which is typically of the order of ⅛ second. The perforated piston flange 43 impacts the elastomeric buffer 52 at the end of the stroke of the piston 32 which brings the piston 32 to a controlled stop. The piston 32 would be returned manually to re-engage the enlarged head 37 in the cylindrical recess 38 before the cylinder 33 is recharged and another missile 31 fitted onto the yoke 50.

Any quiescent gas leakage past the annular seal 41 may be minimised by a plurality of seal elements, but recognising that zero leakage is an unobtainable goal, such leakage needs to be vented to atmosphere, which it is in this embodiment via the restrictive flow path 49 incorporating the miniature check valve 50 which is provided in the bleed orifice 49 to prevent ingress of moisture which might freeze within the housing 34 and cause seal damage or jamming of the piston 32 and disrupt efficient operation.

FIGS. 5 and 6 illustrate a modified form 30A of the ejector ram 30 shown in FIG. 4. Parts of the ejector ram 30A which are similar to corresponding parts of the ejector ram 30 are identified by the same reference characters with the addition of the character "A". The modification introduces means whereby cushioning of the piston 32A at the end of its stroke to extend the ram 30A is enhanced and whereby means for retracting the piston 32A are incorporated.

A tie rod 54 extends substantially coaxially through the housing 34A from one end by which it is fixed to the housing 34A and which is at the centre of the closed end of the cylindrical recess 38A. The rod 54 extends through a central aperture 55 which is formed in the enlarged head 37A of the piston 32A. As was the case with the cylinder 32 of the ejector ram 30 described above with reference to and as illustrated in FIG. 4, the piston 32A is tubular. The end of the tie rod 54 within the interior of the tubular piston 32A carries a plunger head 56 which slides within the interior of the tubular piston 32A.

The plunger head 56 is fitted with a piston ring 57 so that it sealingly engages the interior wall of the tubular piston 32A.

A stack of annular wave springs 58 surround the tie rod 54 within the interior of the hollow piston 32A and extend between the inner face of the enlarged head 37A and the plunger head 56.

Hence a spring force which reacts against the plunger head 56 and acts on the enlarged head 37A, urges the enlarged head 37A towards the cylindrical recess 38A to tend to contract the ejector ram 30A and cushion movement of the piston 32A as the ram 30A is extended. Air trapped in the interior of the tubular piston 32A between the plunger head 56 and the enlarged head 37A, provides a supplementary cushioning effect which augments the action of the wave springs 58 as the ejector ram 30A is extended. Furthermore the wave springs 58 and the gas entrapped between the plunger head 56 and the enlarged head 37A combine to enhance the total retraction force of the ram 30A. The retraction force is generally small compared with the ejection force so that the springs 58 and the gas spring effect have a negligible effect on the ejection energy.

In operation of the pneumatic actuator as described above with reference to and as illustrated in FIGS. 4 to 6, the transient flow of gas through the initiating servo valve 48, 48A must be controlled to prevent an instantaneous high load on the missile 31. This is effected by a combination of throttling of that gas flow and by providing a small volume in the piston inner end recess 38, 38A which takes a finite time to pressurise. This volume may be in the form of an annular groove 59 (see FIG. 4) in the enlarged head 37 into which the gas initially feeds. The gas flow perforations through the piston flange 43 may be sized to give maximum beneficial flow of the elastomeric buffer 17 into the perforations so that shear energy is stored to attenuate the impact shock.

The peak force applied by the piston 32, 32A to the missile 31 is determined by the product of the charge gas pressure in the cylinder chamber 33, 33A and the cross-sectional area of the interior of the piston shaft 39. This cannot be exceeded.

In the absence of flow restriction into, or volumetric capacity within the closed end 36A of the housing 34A of the ejector ram 30A described above with reference to and as illustrated in FIGS. 5 and 6, there would be an extremely rapid pressure rise when the ejector ram 32A was operated, resulting in a step function force input to the missile 31. This would also be the case when the ejector ram 30 described above with reference to and as shown in FIG. 4 was operated in the absence of such a flow restriction or volumetric capacity. Such a shock loading is potentially damaging to the structure of the missile 31 and/or to its inertial guidance systems, and should be avoided.

Figure 7:
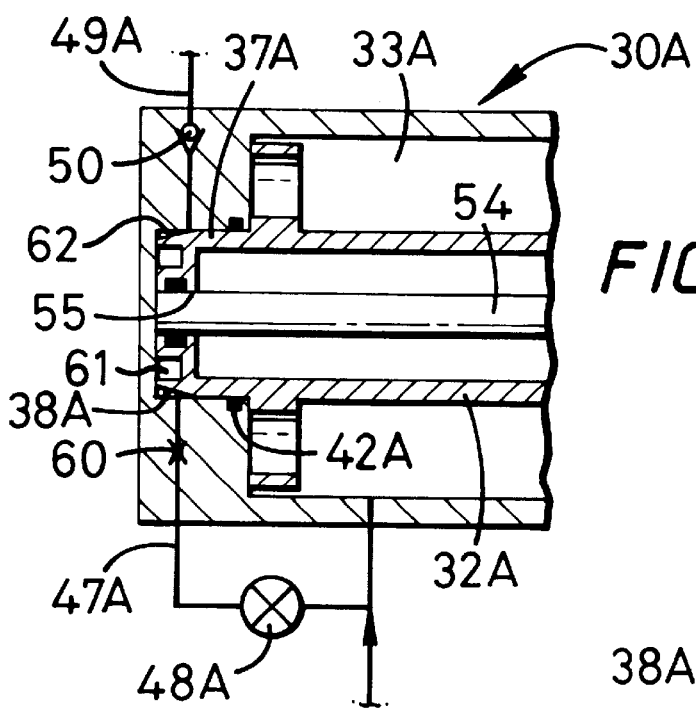
FIG. 7 is a fragmentary view similar to the left hand portion of FIG. 5 illustrating a modification of the pneumatic actuator shown in FIG. 5.
Figure 8:
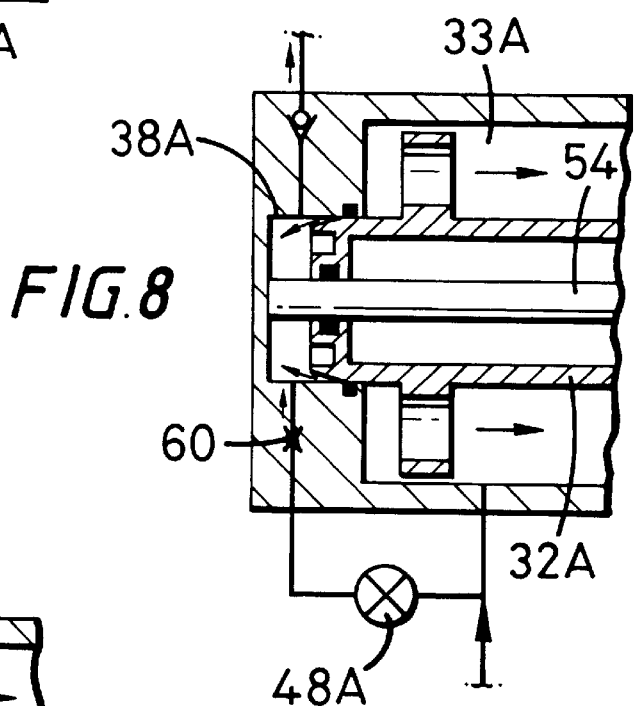
FIG. 8 is a view similar to FIG. 7 showing the ram piston after initial displacement in the direction to extend the ejector ram.
Figure 9:
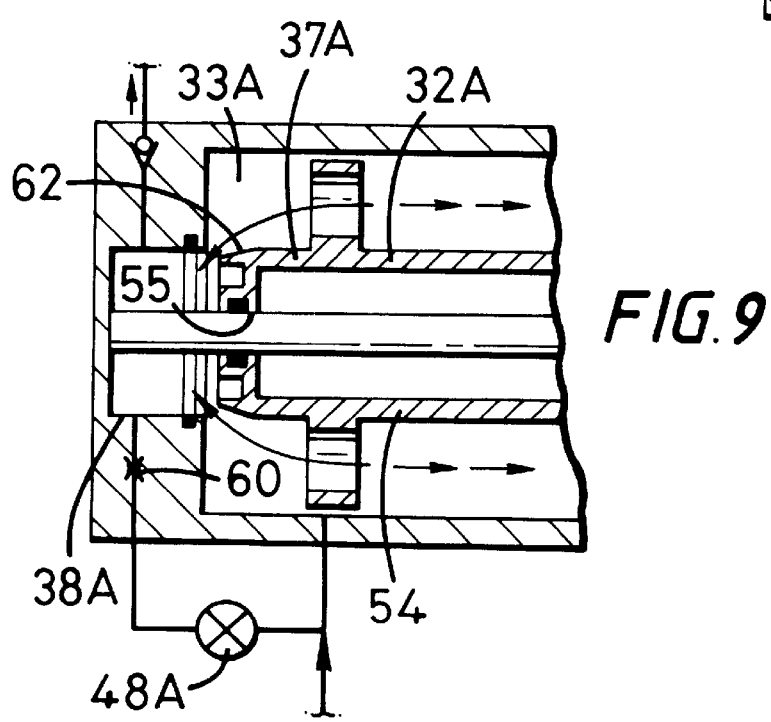
FIG. 9 is a view similar to FIGS. 7 and 8 showing the ram piston after further displacement in the direction to extend the ejector ram.

FIGS. 7, 8 and 9 illustrate a modification of the pneumatic actuator 30A described above with reference to FIGS. 5 and 6 by which destructive shock loads are eliminated at commencement of motion of the ram piston 32A by means of transient control by a combination of features.

Firstly, the flow of gas into the inner end of the cylindrical recess 38A between the annular groove 42A and the closed end of the cylindrical recess 38A that is closed by the enlarged head 37A is restricted by a throttling device 60 which can be set precisely to give the required flow characteristics and which is fitted into the small pipe 47A between the servo valve 48 and the cylindrical recess 38A.

Secondly, an annular groove 61 is formed in the end face of the enlarged head 37A around the central aperture 55 that slidably receives the tie rod 54. The annular groove 61 serves as an expansion volume within this region of the cylindrical recess 38A that is closed by the enlarged head 37A which provides a means of damping pressure fluctuation.

Thirdly, the disengagement of the enlarged head 37A from the cylindrical recess 38A as is shown in FIGS. 8 and 9, results in a gradual increase in gas bleed area from the main cylinder chamber 33A to the space within the cylindrical recess 38A between the enlarged head 37A and the closed end of the cylindrical recess 38A, because the circumferentially extending peripheral surface 62 of the enlarged head 37A is tapered towards the end face in which the annular groove 61 is formed.

Finally, the restricted vent flow from the cylindrical recess 38A through the flow path 49A incorporating the miniature check valve 50 to atmosphere also slightly attenuates the initial effect of the inflow of gas into the portion of the cylindrical recess 38A between the annular groove 42A and the closed end of the cylindrical recess 38A. Losses of gas pressure to atmosphere through this restricted vent 49A during the short time span (less than 150 milliseconds) of the process of ejection of a missile 31 carried by the system are negligible in terms of energy loss.

FIG. 9 shows the enlarged head 37A of the ram piston 32A displaced out of the cylindrical recess 38A and thereby exposed to the full pressure in the cylinder chamber 33A across its full width which continues for the remainder of the stroke of the ram piston 32A as has been described above.

The relative dimensions of the annular groove 61 and the tapered peripheral end portion of the enlarged head 37A may be used selectively to adjust the rate of pressure rise acting on the enlarged head 37A and to effect the shortest acceptable transition to full thrust due to gas pressure action on the ram piston 32A as shown in FIG. 9 for a given inertial load. Typically this would be in the region of 20 millisecond in this embodiment.

Figure 10:
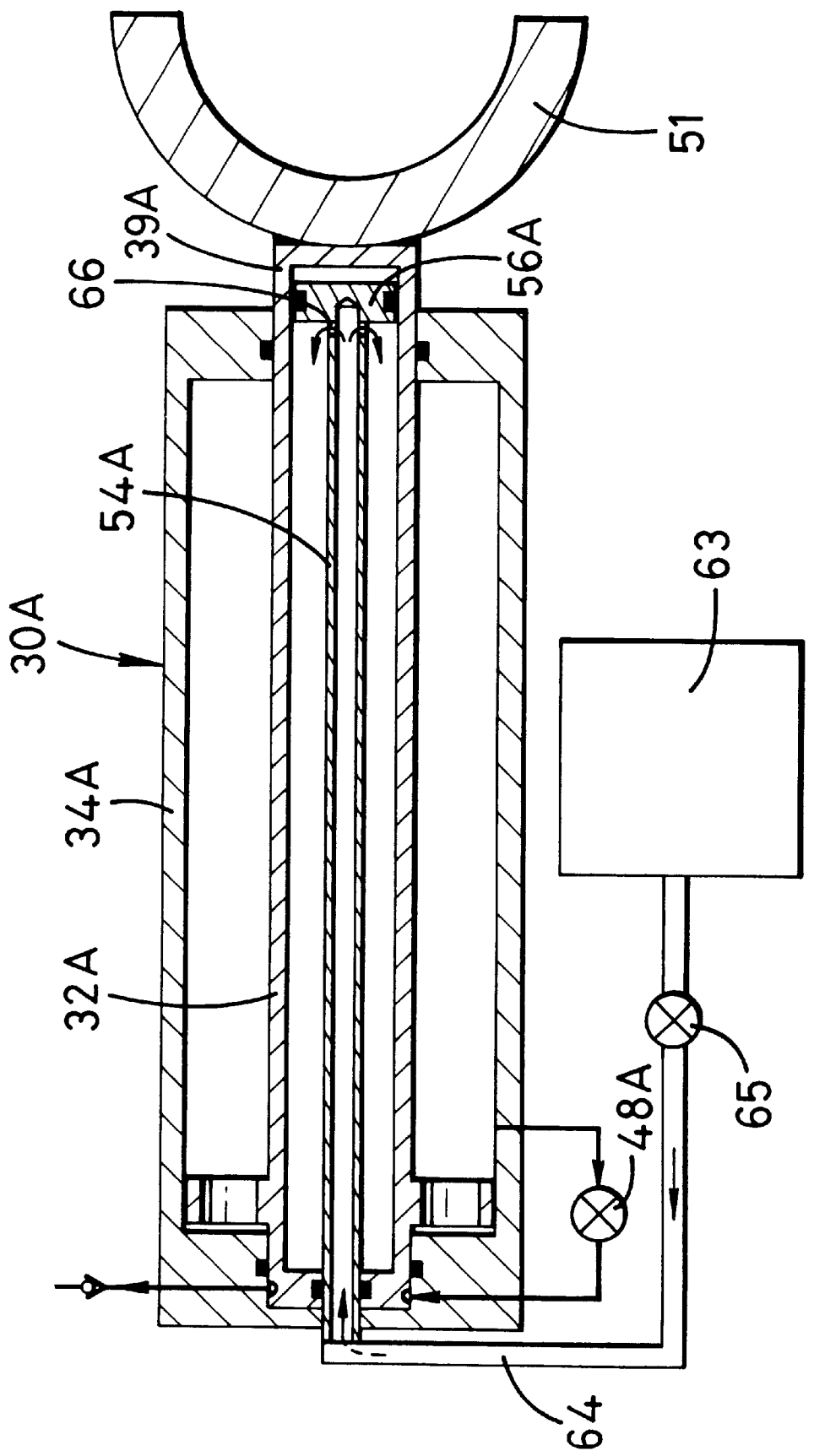
FIG. 10 is a view similar to FIG. 4 of another modified form of the actuator shown in FIG. 4.

FIG. 10 shows a further modification of the form of pneumatic actuator 30A described with reference to FIGS. 5 to 9 which is applicable to the situation where a greater retraction force is necessary, for example due to excessive sliding friction in the piston assembly caused by lateral aerodynamic forces on the exposed piston shaft 39A or if maximum energy is required from the gas in the housing 34A. This embodiment does not include the wave springs 58 that have been described above with reference to FIGS. 5 and 6. Instead a separate reservoir 63 of high pressure gas is provided outside the actuator 30A and the rod 54A is tubular. The reservoir 63 is connected by a conduit 64 to the passage formed by the interior of the tubular tie rod 54A. A control valve 65 controls gas flow through the conduit 64. Lateral apertures 66 are formed in the wall of the tubular tie rod 54A near the piston head 56A. The control valve 65 is opened automatically by a separate mechanical linkage attached to the piston yoke 51 which operates electrical switches substantially as described in GB-A-2078912 to release gas under pressure from the reservoir 63 and feed it through the tubular tie rod 54A to emerge through the apertures 66 to effect return of the piston 32A to the contracted state.

Figure 11:
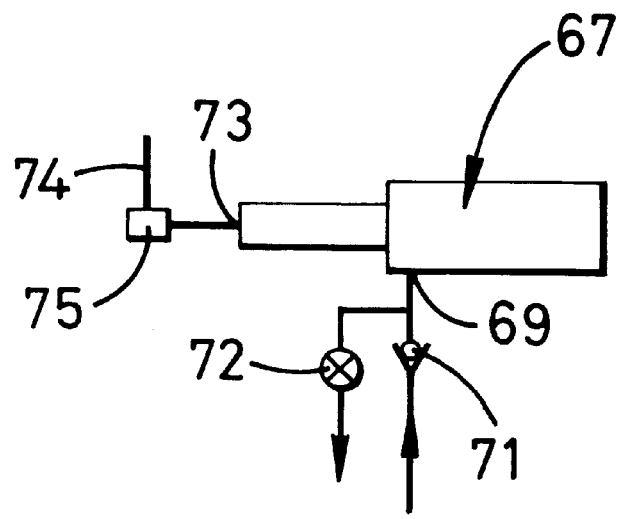
FIG. 11 is a schematic diagram of a gas pressure intensification system for use with a pneumatic actuator for carrying and ejecting a missile from an aircraft.
Figure 13:
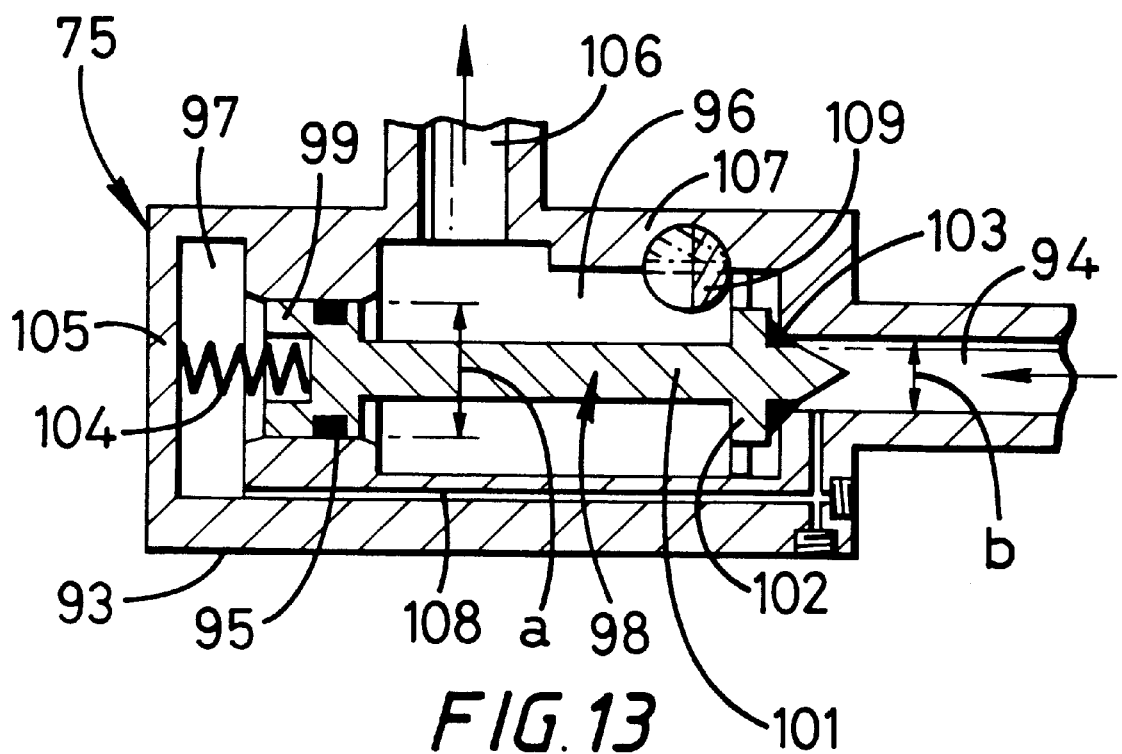
FIG. 13 is a section of a valve which is used in conjunction with the gas pressure intensification device shown in FIG. 12 in the system shown in FIG. 11.
Figure 12:
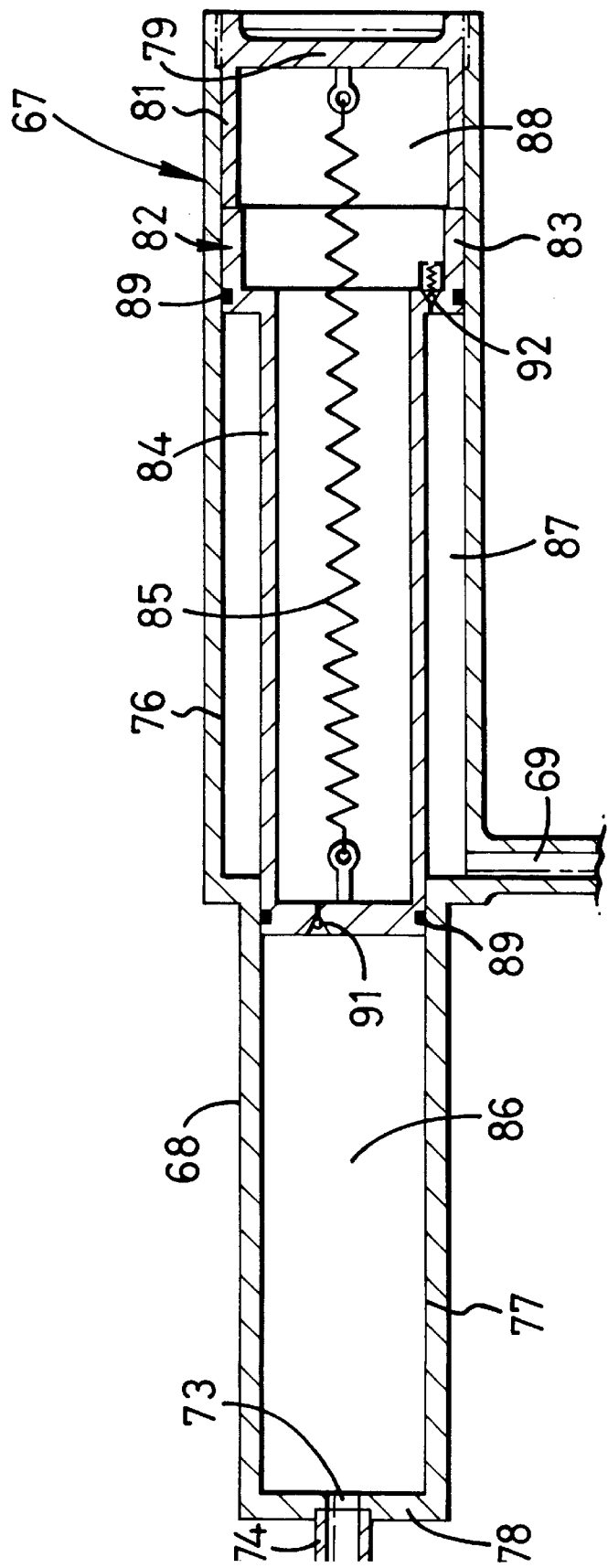
FIG. 12 is a sectional view to a larger scale than FIG. 11 of the gas pressure intensification device of the system shown in FIG. 11.

FIGS. 11 to 13 illustrate a gas pressure intensification system which is incorporated in a gas storage vessel assembly which is the source of working pressure for pneumatic operation of missile ejector release units which were originally designed to be operated by hot gas generated by pyrotechnic devices where working pressures are customarily higher than those available from compressed air bottles or air compressors. The gas pressure intensification system operates to intensify the pressure of gas supplied to operate the ejector release units so as to counter the significant pressure drop due to expansion that would occur when the gas is released into the gas system of the ejector release units from conventional compressed air bottles or air compressors even before any useful work is done. In operation of this embodiment of the invention, the pressure drop caused by such an initial expansion is offset by an intensification process in the storage assembly.

FIG. 11 shows a gas pressure intensifier 67 having a housing 68 with a port 69 to which a check valve 71 and a dump valve 72 are connected in parallel. The check valve 71 allows gas to flow from an external source (not shown) into the interior of the housing 68. The dump valve 72 allows gas to be discharged from within the housing 68. The housing 68 has a main exit port 73 which is connected by a conduit 74 to the ejector rams and latch release valves of a missile store and ejection system incorporating the ejector release units. A valve 75 in the conduit 74 is operable to close the conduit 74 and thereby to retain gas within the housing 68 until a rapid pressure rise is detected whereupon it opens fully to allow gas flow from within the housing 68 to the rams and latch release valves. The valve 75 is described below in detail with reference to FIG. 13.

FIG. 12 shows the interior of the housing 68, is formed as a stepped cylindrical chamber having two parts, one part 76 having a larger cross-sectional area than the other part 77. The outer end of the smaller cylindrical chamber part 77 is closed by an end wall 78 in which the main exit port 73 is formed centrally. The outer end of the larger cylindrical chamber part 76 is closed by a removable closure 79 which carries a sleeve 81 which is pushed into the larger cylindrical chamber part 76.

A hollow stepped piston 82 has a larger diameter piston portion 83 which slides within the larger cylindrical chamber part 76 and a smaller diameter piston portion 84 which slides within the smaller cylindrical chamber part 77. The smaller end of the piston 82 is closed. The other end of the hollow stepped piston 82 is open so that the interior of the hollow stepped piston 82 communicates with the interior of the larger diameter cylindrical chamber 76 between the piston 82 and the removable closure 79. A tension spring 85 biasses the piston 82 into abutment with the sleeve 81.

The stepped piston 82 separates the interior of the housing 68 into three isolated spaces, namely the space 86 between the closed end of the piston 82 and the closed end wall 78 of the smaller cylindrical chamber part 77, an annular space 87 which surrounds the smaller diameter piston portion 84 and which extends between the step of the housing 68 and the step of the piston 82 and the space 88 that comprises the interior of the hollow piston 82, any portion of the larger diameter cylindrical chamber part 76 between the hollow piston 82 and the sleeve 81 together with the interior of the sleeve 81 up to the removable closure 79. The smaller and larger diameter portions 83 and 84 of the piston 82 that respectively slide within the smaller and larger cylindrical chamber parts 76 and 77 are provided with dynamic seals 89 which operate to prevent gas leakage past them during operation. Hence, apart from the port 69 and the port 73, the whole of the interior of the housing 68 is gas tight.

The dimensions of the piston 82 are carefully chosen so that the cross-sectional area of the annular space 87 is slightly greater than, or equal to, the cross-sectional area of the smaller diameter piston part 84. In this way, the piston 82 is neutrally stable or slightly biassed towards the larger end of the housing 68 that is closed by the removable closure 79.

A miniature non-return valve 91 is provided in the closed end wall of the piston 82 at the smaller diameter end of that piston 82 and is operable to allow gas to flow from the space 88 within the piston 82 to the space 86. Another miniature non-return valve 92 is provided in the step portion of the piston 82 and is operable to allow gas flow from the annular space 87 to the space 88.

FIG. 13 shows that the valve 75 has a hollow housing 93. The interior of the hollow housing 93 forms a central inlet passage 94 and a larger diameter coaxial bore portion 95 which is spaced from the passage 94 by a plenum chamber 96 which has a larger diameter than the larger diameter bore portion 95. The latter separates the plenum chamber 96 from a spring chamber 97 which is also larger in cross-sectional area than the larger diameter bore portion 95. A differential area piston valve 98 has one piston portion 99 which slides in the larger diameter bore portion 95, a stem portion 101 which projects coaxially from the piston portion 99 and through the plenum chamber 96 and an obturating member 102 which is at the end of the stem portion 101 remote from the piston portion 99. The obturating member 102 has a tapered portion which is designed to seat in the mouth 103 by which the inlet passage 94 communicates with the plenum chamber 96 whereby to close communication between the inlet passage 94 and the plenum chamber 96. A coil spring 104 in the spring chamber 97 reacts against an end wall 105 of the spring chamber 97 and urges the piston valve 98 to seat its obturating member 102 in the mouth 103 of the inlet passage 94.

An outlet passage 106 is formed in a side wall 107 of the hollow housing 93 so as to communicate with the plenum chamber 96. The diameter of the inlet passage 94 is shown as "b" in FIG. 13 and is smaller than the diameter of the larger diameter bore portion 95 which is shown as "a" in FIG. 13.

A passage 108 of flow restricting dimensions interconnects the spring chamber 97 with the inlet passage 94 upstream of its mouth 103.

A sealed rotary key 109 is mounted in the housing 93 between the outlet passage 106 and the mouth 103 of the inlet passage 94 so as to project into the plenum chamber 96. The rotary key 109 is rotatable from the one position shown in FIG. 13 in which it inhibits rectilinear movement of the piston valve 98 to unseat the obturating member 102 from the mouth 103 of the inlet passage 94 to another position shown dotted in FIG. 13 in which movement of the piston valve 98 against the bias of the coil spring 104 to open the mouth 103 of the inlet passage 94 is possible.

The key 109 is locked to lock the piston valve 98 in position shown in FIG. 13 to close the inlet passage 94 for ground safety. It will be unlocked either before or during flight and may be remotely operable by a suitable actuator.

When compressed gas is fed through the check valve 71 into the annular space 87 through the port 69, pressure in the annular space 87 builds up to a certain level at which it passes through the non-return valve 92 in the step of the piston 82 into the space 88. The supply of compressed gas continues and the pressure in the space 88 builds up until a further certain level whereupon gas passes through the check valve 91 in the smaller end of the piston 82 into the space 86. This continues until the whole of the housing 68, the conduit 74 and the inlet passage 94 of the valve 75 is filled with high pressure gas which may be either air or nitrogen. The valve 75 is closed initially by the action of the coil spring 104 in the spring chamber 97 on the piston valve 98. As pressure builds up in the space 86 and the inlet passage 94 of the valve 75, that pressure is also established in the spring chamber 97 via the passage 108 of flow restricting dimensions between the inlet passage 94 and the spring chamber 97. Hence, in steady state conditions, the piston valve 98 is held closed by the differential pressure loading on it, the gas pressure in the spring chamber 97 acting on the larger diameter piston portion 99 of the valve 75.

The system is activated by operation of the dump valve 72 which may be electrically triggered by command of the operator. When so triggered the dump valve 72 discharges the annular space 87 rapidly thereby unbalancing the gas pressure loading on the stepped piston 82. The latter is urged into the smaller diameter space 86 against the action of its biassing spring 85 by the gas pressure in the space 88. That displacement of the piston 82 intensifies the gas pressure in the smaller diameter space 86 and in the inlet passage 94 of the valve 75 which results in unseating of the piston valve 98 against the action of the gas pressure in the spring chamber 97 and the loading of the coil spring 104, due to the flow restricting action of the passage 108 of flow restricting dimensions. The gas pressure in the space 86 and the inlet passage 94 is thereby transferred to the plenum chamber 96 of the,valve 75 and from there through the outlet port 106 to the ejector release unit gas system. Once that pressure is established in the plenum chamber 96 of the valve 75, the valve 75 is no longer gas biassed closed but is then held open by the rising intensified pressure from the space 86 and the inlet passage 94.

What is claimed is:

1. A stores carriage and ejection system which is operable to carry the stores on an aircraft in flight and to eject those stores from the aircraft on demand, comprising: at least one pneumatic actuator having an actuating member which includes an actuating rod portion which extends from a differential area piston having two piston portions, the cross-sectional areas of which are different, the differential area piston being slidable in a closed chamber which is filled with gas under pressure and from which the actuating rod portion projects, one of the piston portions which is gas impervious, being slidably engageable in and initially closing a cavity which is formed in an end wall of the closed chamber, and which has a cross-section complementing that of said one piston portion, and means operable when said one piston portion is engaged in said cavity to apply gas under pressure to said one piston portion at a surface thereof which is formed at an end of said one piston portion remote from the other piston portion, thereby to apply an actuating thrust to the actuating member and to displace said one piston portion from the cavity so that the greater cross-sectional area of the differential area piston is subjected to the gas under pressure within the closed chamber.

2. A stores carriage and ejection system according to claim 1, including releasable hold back means operable to hold the piston in the location that is furthest from the location of the piston at which the volume within the chamber is at its maximum.

3. A stores carriage and ejection system which is operable to carry the stores on an aircraft in flight and to eject those stores from the aircraft on demand, comprising: at least one pneumatic actuator having an actuating member which includes an actuating rod portion which extends from a differential area piston having two piston portions, the cross-sectional areas of which are different, the differential area piston being slidable in a closed chamber which is filled with gas under pressure when the actuator is operated and from which the actuating rod portion projects, one of the piston portions being slidably engageable in a cavity which is formed in an end wall of the closed chamber and which has a cross-section similar to that of said one piston portion, means operable when said one piston portion is engaged in said cavity to apply gas under pressure to a surface of said one piston portion which is formed at an end thereof remote from the other piston portion whereby to apply an actuating thrust to the actuating member and to displace said one piston portion from the cavity so that the greater cross-sectional area of the differential area piston is subjected to the gas under pressure within the closed chamber, and releasable hold-back means operable to hold the piston in the location that is furthest from the location of the piston at which the volume within the chamber is at its maximum, wherein the chamber is a cylinder closed at one end and separated by said end wall from a second chamber to be charged with compressed gas in use of the actuator, the end wall having an aperture that serves as said cavity, the two piston portions form a stepped piston and the actuating rod portion is a piston rod, the stepped piston being mounted at one end of the piston rod by the one piston portion, wherein the piston rod extends through the aperture and the second chamber and has a cross-sectional area smaller than that of the aperture that slidably receives said one piston portion of the stepped piston, the releasable hold-back means being operable to hold the piston adjacent to the end wall with said one piston portion received in the aperture.

4. A stores carriage and ejection system according to claim 3, wherein the dimensions of the piston rod and the aperture allow substantially unrestricted gas flow between the second chamber and the cylinder when said one piston portion is displaced from the aperture towards the closed end of the cylinder.

5. A stores carriage and ejection system according to claim 3, wherein valve means are provided which are operable to place both sides of the piston in communication one with the other for a return stroke of the piston when the piston has been driven to the closed end of the cylinder by the action of compressed gas in the other chamber.

6. A stores carriage and ejection system according to claim 5, wherein the valve means comprise a bi-stable shuttle valve which is switched from one of its states to the other by arrival of the piston at either end of the cylinder.

7. A stores carriage and ejection system which is operable to carry the stores on an aircraft in flight and to eject those stores from the aircraft on demand, comprising: at least one pneumatic actuator having an actuating member which includes an actuating rod portion which extends from a differential area piston having two piston portions, the cross-sectional areas of which are different, the differential area piston being slidable in a closed chamber which is filled with gas under pressure when the actuator is operated and from which the actuating rod portion projects, one of the piston portions being slidably engageable in a cavity which is formed in an end wall of the closed chamber and which has a cross-section similar to that of said one piston portion, means operable when said one piston portion is engaged in said cavity to apply gas under pressure to a surface of said one piston portion which is formed at an end thereof remote from the other piston portion whereby to apply an actuating thrust to the actuating member and to displace said one piston portion from the cavity so that the greater cross-sectional area of the differential area piston is subjected to the gas under pressure within the closed chamber, and releasable hold-back means operable to hold the piston in the location that is furthest from the location of the piston at which the volume within the chamber is at its maximum, releasable hold-back means including an external latch.

8. A stores carriage and ejection system according to claim 7, wherein the latch includes a pivoted arm having an arcuate end portion which functions in the manner of a zero lift cam, the arm being positioned so that the end portion is abutted by an abutment carried by a member which is coupled to the piston whereby to hold the piston in said location, the piston being released by displacement of the arm so that the end portion is moved to one side of the abutment, whereby the abutment is free for movement with the piston.

9. A stores carriage and ejection system according to claim 8, including means operable to displace the arm, said means and the arm being dynamically balanced.

10. A pneumatic actuator according to claim 7, wherein the external latch includes a collapsible pair of under-centre strut links which are coupled with the piston, which are held by the latch in stable equilibrium against the action of compressed gas on the piston and which are arranged to collapse and allow movement of the piston when the latch is released.

* * * * *

UNITED STATES PATENT AND TRADEMARK OFFICE
CERTIFICATE OF CORRECTION

PATENT NO.    : 6,481,669 B1                                    Page 1 of 1
DATED         : November 19, 2002
INVENTOR(S)   : Dennis Griffin It is certified that error appears in the above-identified patent and that said Letters Patent is hereby corrected as shown below:

Column 16,
Line 44, "pneumatic actuator" should read -- stores carriage and ejection system --.

Signed and Sealed this

Fifteenth Day of July, 2003

JAMES E. ROGAN
*Director of the United States Patent and Trademark Office*